United States Patent [19]
Nakatsugawa

[11] Patent Number: 6,151,375
[45] Date of Patent: Nov. 21, 2000

[54] TRANSMITTER, RECEIVER, COMMUNICATION APPARATUS, COMMUNICATION METHOD AND COMMUNICATION SYSTEM

[75] Inventor: Yoshinori Nakatsugawa, Susono, Japan

[73] Assignee: Yazaki Corporation, Tokyo, Japan

[21] Appl. No.: 09/006,480

[22] Filed: Jan. 13, 1998

[30] Foreign Application Priority Data

Jan. 14, 1997 [JP] Japan ................................ 9-004843
Sep. 2, 1997 [JP] Japan ................................ 9-237422

[51] Int. Cl.$^7$ ................................................ H04L 25/38
[52] U.S. Cl. ........................... 375/370; 375/368; 370/512
[58] Field of Search ........................ 375/370, 362, 375/364, 365, 368, 369; 370/509, 512, 503, 528

[56] References Cited

U.S. PATENT DOCUMENTS 5,568,403 10/1996 Deiss et al. .......................... 709/236
5,661,728 8/1997 Finotello et al. ....................... 370/503

*Primary Examiner*—Don N. Vo
*Assistant Examiner*—Phuong Phu
*Attorney, Agent, or Firm*—Oblon, Spivak, McClelland, Maier & Neustadt, P.C.

[57] ABSTRACT

In a communication system in which an asynchronous mode is employed as a media access control system, a synchronizing signal of digital data, which are sent out from a sender terminal apparatus and separated into the synchronizing signal and the bit stream data, is converted into block synchronizing signals which consist of a start signal indicating head position of bit stream data and an end signal indicating end position thereof, then the bit stream data and converted block synchronizing signals are converted into compressed block data by multiplexing them not to be overlapped on a time base respectively, and then the compressed block data are transmitted to a destination terminal apparatus via a data transmission line.

12 Claims, 7 Drawing Sheets

⇩ MODULATION

⇩ DEMODULATION

TRANSMITTER, RECEIVER, COMMUNICATION APPARATUS, COMMUNICATION METHOD AND COMMUNICATION SYSTEM

BACKGROUND OF THE INVENTION

1. Field of the Invention

The present invention relates to a communication system constructed by connecting, via a data transmission line, between plural communication apparatuses to which terminal apparatuses are connected respectively and employing asynchronous mode as a media access control system and, more particularly, a transmitter, a receiver, a communication apparatus, a communication method and a communication system, capable of executing smooth data exchange between any terminal apparatuses in real time even if a data transmission line having relatively small transmission capacity is employed.

2. Description of the Prior Art

In recent years, a digital satellite broadcast which can broadcast digital data as a broadcasting object including video, sound, character, etc. via satellite radio wave has been rapidly spread. In broadcasting digital data, the enterprise for delivering the digital satellite broadcast first performs a predetermined conversion process of the digital data as broadcast object. Such conversion process will be explained in brief. The digital data as the broadcast object is first compressed (low-bit-rate coded) in terms of MPEG2 (Moving Picture Image Coding Experts Group Phase 2) which is a moving picture compression method employed in a digital TV set, a DVD (Digital Video Disc, or Digital Versatile Disc) player, etc., and then such compressed data are converted into bit stream data which are packeted by adding header information including synchronizing signals according to the standard of the MPEG2. The bit stream data are multiplexed in compliance with the standard of MPEG2 Systems which is used to multiplex video data, sound data, and other data being coded by MPEG2, then predetermined processes of multiplexed MPEG2 data such as modulation, etc. are performed, and then such processed data are transmitted from an earth station to a communication satellite as broadcast radio waves.

Meanwhile, the receiver of the digital satellite broadcast receives the satellite radio waves transmitted from the communication satellite by using a tuner module via an antenna, and then the received MPEG2 data are subject to a predetermined inverse conversion process. Such inverse conversion process will be explained in brief. At first, the header information of the received MPEG2 data are decoded so as to output the synchronizing signals and the compressed bit stream data separately. The compressed bit stream data which are output in synchronism with the output synchronizing signals are decoded by an MPEG2 decoder and then expanded into the digital data form before the compression has been effected. Next, the expanded digital data are converted in analog signals and then input into a monitor. Received video, sound, etc. are reproduced by the monitor.

At any rate, recently such a request is increasing that the digital data, e.g., digital data received via the above digital satellite broadcast, digital data reproduced by the DVD player, etc., in which the synchronizing signals and the bit stream data are separated, should be handled in terms of a centralization process employing an asynchronous mode as the media access control system in a communication system, which is constructed by connecting plural communication apparatuses including a personal computer, etc. for example, via the data transmission line. This is because it is convenient to commonly use mutual output data in plural communication apparatuses if the communication system can be so constructed that the digital data being sent out from respective communication apparatuses can be exchanged among respective communication apparatuses and in addition it is advantageous to transmit multimedia data including sound, moving picture, etc. in real time if the asynchronous mode can be employed as the media access control system.

However, in order to satisfy the request that the digital data in which the synchronizing signals and the bit stream data are separated should be handled based on centralization process employing an asynchronous mode as the media access control system in the conventional communication system, there is necessity of employing a data transmission line with relatively large transmission capacity which enables transmission of data such as moving picture having a large quantity of information. As a consequence, there have been to-be-overcome problems that a margin in design is limited to construct the communication system and also the conventional communication system is disadvantageous in a cost aspect.

SUMMARY OF THE INVENTION

The present invention has been made in view of the above circumstances, and it is an object of the present invention to provide a transmitter, a receiver, a communication apparatus, a communication method and a communication system, capable of executing smooth data exchange in real time between any terminal apparatuses even if a data transmission line having relatively small transmission capacity is employed. More specifically, the above object of the present invention can be implemented by converting synchronizing signals, which are included in digital data being sent out from a sender terminal apparatus in the form of the synchronizing signals and bit stream data, into block synchronizing signals which consist of a start signal indicating head position of the bit stream data and an end signal indicating end position thereof, then converting the bit stream data and the converted block synchronizing signals into block data by multiplexing them not to be overlapped on a time base, and then transmitting the block data to a destination terminal apparatus via such data transmission line.

In order to achieve the above object of the present invention, there is provided a transmitter for transmitting digital data sent out from own sender terminal apparatus among plural terminal apparatuses to a destination terminal apparatus via a data trans-mission line, the plural terminal apparatuses being connected to a communication system in which an asynchronous mode is employed as a media access control system, the transmitter comprising: synchronous modulating means for converting a synchronizing signal of digital data into block synchronizing signals which consist of a start signal a head position of bit stream data and an end signal indicating end position thereof, the digital data being sent out from the own sender terminal apparatus and separated into the synchronizing signal and the bit stream data; multiplexing means for multiplexing the bit stream data and the block synchronizing signals converted by the synchronous modulating means in terms of modulation process not to be overlapped on a time base respectively to thus generate block data; and transmitting means for transmitting the block data generated by the multiplexing means to one or more than two destination terminal apparatuses via the data transmission line.

According to the present invention, first of all the synchronous modulating means can convert a synchronizing signal of digital data into block synchronizing signals which consist of a start signal indicating head position of bit stream data and an end signal indicating end position thereof, and the digital data are sent out from the own sender terminal apparatus and separated into the synchronizing signal and the bit stream data. Next, the multiplexing means can multiplex the bit stream data and the block synchronizing signals converted by the synchronous modulating means in terms of modulation process not to be overlapped on a time base respectively to thus generate block data. And, the transmitting means can transmit the block data generated by the multiplexing means to one or more than two destination terminal apparatuses via the data transmission line.

Therefore, according to the present invention, because the digital data which are sent out from the sender terminal apparatus and separated into the synchronizing signals and the bit stream data are transmitted in the form of integrated block data to the destination terminal apparatus via the data transmission line, smooth data exchange can be implemented in real time between any terminal apparatuses even if the data transmission line having relatively small transmission capacity is employed.

In addition, since the asynchronous mode which is advantageous to real-time transmission can be employed as the media access control system, multimedia data including sound, moving picture, etc. for which the real-time processing is required can be transmitted in real time without delay.

In order to achieve the above object of the present invention, there is provided a receiver for receiving digital data sent out from a sender terminal apparatus among plural terminal apparatuses via a data transmission line and then sending out the digital data to own destination terminal apparatus, the plural terminal apparatuses being connected to a communication system in which an asynchronous mode is employed as a media access control system, the receiver comprising: receiving means for receiving block data via the data transmission line, the block data being generated by executing modulation process to multiplex bit stream data which are sent out from the sender terminal apparatus and block synchronizing signals which consist of a start signal indicating head position of the bit stream data and an end signal indicating end position thereof; inverse multiplexing means for inverse-multiplexing the block data received by the receiving means in terms of demodulation process to distribute individually the block synchronizing signals and the bit stream data respectively; and synchronous demodulating means for demodulating the block synchronizing signals distributed by the inverse multiplexing means into synchronizing signals of the bit stream data and then sending out the demodulated synchronizing signals and the bit stream data to the own destination terminal apparatus.

According to the present invention, first the receiving means can receive the block data via the data transmission line, and the block data are generated by executing modulation process to multiplex bit stream data which are sent out from the sender terminal apparatus and block synchronizing signals which consist of a start signal indicating head position of the bit stream data and an end signal indicating end position thereof. Next, the inverse multiplexing means can inverse-multiplex the block data received by the receiving means in terms of demodulation process to distribute individually the block synchronizing signals and the bit stream data respectively. And, the synchronous demodulating means can demodulate the block synchronizing signals distributed by the inverse multiplexing means into synchronizing signals of the bit stream data, and then send out the demodulated synchronizing signals and the bit stream data to the own destination terminal apparatus.

Therefore, according to the present invention, because the digital data can be received in the form of integrated block data via the data transmission line, smooth data exchange can be implemented in real time between any terminal apparatuses even if the data transmission line having relatively small transmission capacity is employed.

In addition, since the asynchronous mode which is advantageous to real-time transmission is employed as the media access control system, multimedia data including sound, moving picture, etc. for which the real-time processing is required can be transmitted in real time without delay.

In order to achieve the above object of the present invention, there is provided a communication apparatus for transmitting digital data sent out from own sender terminal apparatus among plural terminal apparatuses to a destination terminal apparatus via a data transmission line, and receiving the digital data sent out from a sender terminal apparatus among the plural terminal apparatuses via the data transmission line and then sending out the digital data to own another destination terminal apparatus, the plural terminal apparatuses being connected to a communication system in which an asynchronous mode is employed as a media access control system, the communication apparatus comprising: synchronous modulating means for converting a synchronizing signal of digital data into block synchronizing signals which consist of a start signal indicating head position of bit stream data and an end signal indicating end position thereof, the digital data being sent out from the own sender terminal apparatus and separated into the synchronizing signal and the bit stream data; multiplexing means for multiplexing the bit stream data and the block synchronizing signals converted by the synchronous modulating means in terms of modulation process not to be overlapped on a time base respectively to thus generate block data; transmitting means for transmitting the block data generated by the multiplexing means to one or more than two destination terminal apparatuses via the data transmission line; receiving means for receiving the block data sent out from the sender terminal apparatus via the data transmission line; inverse multiplexing means for inverse-multiplexing the block data received by the receiving means in terms of demodulation process to distribute individually the block synchronizing signals and the bit stream data respectively; and synchronous demodulating means for demodulating the block synchronizing signals distributed by the inverse multiplexing means into synchronizing signals of the bit stream data and then sending out the demodulated synchronizing signals and the bit stream data to the own destination terminal apparatus.

According to the present invention, first of all the synchronous modulating means can convert a synchronizing signal of digital data into block synchronizing signals which consist of a start signal indicating head position of bit stream data and an end signal indicating end position thereof, and the digital data are sent out from the own sender terminal apparatus and separated into the synchronizing signal and the bit stream data. Then, the multiplexing means can multiplex the bit stream data and the block synchronizing signals converted by the synchronous modulating means in terms of modulation process not to be overlapped on a time base respectively to thus generate block data. And, the transmitting means can transmit the block data generated by the multiplexing means to one or more than two destination terminal apparatuses via the data transmission line.

Then, the receiving means can receive the block data sent out from the sender terminal apparatus via the data transmission line. Next, the inverse multiplexing means can inverse-multiplex the block data received by the receiving means in terms of demodulation process to distribute individually the block synchronizing signals and the bit stream data respectively. And, the synchronous demodulating means can demodulate the block synchronizing signals distributed by the inverse multiplexing means into synchronizing signals of the bit stream data and then send out the demodulated synchronizing signals and the bit stream data to the own destination terminal apparatus.

Therefore, according to the present invention, because the digital data which are sent out from the sender terminal apparatus and separated into the synchronizing signals and the bit stream data can be transmitted in the form of integrated block data to the destination terminal apparatus via the data transmission line and also the digital data can be received in the form of integrated block data via the data transmission line, smooth data exchange can be implemented in real time between any terminal apparatuses even if the data transmission line having relatively small transmission capacity is employed.

In addition, since the asynchronous mode which is advantageous to real-time transmission is employed as the media access control system, multimedia data including sound, moving picture, etc. for which the real-time processing is required can be transmitted in real time without delay.

In order to achieve the above object of the present invention, there is provided a communication apparatus for transmitting digital data sent out from own sender terminal apparatus among plural terminal apparatuses to a destination terminal apparatus via a data transmission line, and receiving the digital data sent out from a sender terminal apparatus among the plural terminal apparatuses via the data transmission line and then sending out the digital data to own another destination terminal apparatus, the plural terminal apparatuses being connected to a communication system in which an asynchronous mode is employed as a media access control system, the communication apparatus comprising: synchronous modulating means for converting a synchronizing signal of digital data into block synchronizing signals which consist of a start signal indicating head position of compressed bit stream data and an end signal indicating end position thereof, the digital data being sent out from the own sender terminal apparatus and separated into the synchronizing signal and the compressed bit stream data; multiplexing means for multiplexing the compressed bit stream data and the block synchronizing signals converted by the synchronous modulating means in terms of modulation process not to be overlapped on a time base respectively to thus generate block data; transmitting means for transmitting the block data generated by the multiplexing means to one or more than two destination terminal apparatuses via the data transmission line; receiving means for receiving the block data sent out from the sender terminal apparatus via the data transmission line; inverse multiplexing means for inverse-multiplexing the block data received by the receiving means in terms of demodulation process to distribute individually the block synchronizing signals and the compressed bit stream data respectively; and synchronous demodulating means for demodulating the block synchronizing signals distributed by the inverse multiplexing means into synchronizing signals of the compressed bit stream data and then sending out the demodulated synchronizing signals and the compressed bit stream data to the own destination terminal apparatus.

According to the present invention, at first the synchronous modulating means can convert a synchronizing signal of digital data into block synchronizing signals which consist of a start signal indicating head position of compressed data and an end signal indicating end position thereof, and the digital data are sent out from the own sender terminal apparatus and separated into the synchronizing signal and the compressed data. Then, the multiplexing means can multiplex the compressed data and the block synchronizing signals converted by the synchronous modulating means in terms of modulation process not to be overlapped on a time base respectively to thus generate block data. And, the transmitting means can transmit the block data generated by the multiplexing means to one or more than two destination terminal apparatuses via the data transmission line.

Then, the receiving means can receive the block data sent out from the sender terminal apparatus via the data transmission line. Next, the inverse multiplexing means can inverse-multiplex the block data received by the receiving means in terms of demodulation process to distribute individually the block synchronizing signals and the compressed data respectively. And, the synchronous demodulating means can demodulate the block synchronizing signals distributed by the inverse multiplexing means into synchronizing signals of the compressed data and then sending out the demodulated synchronizing signals and the compressed data to the own destination terminal apparatus.

Therefore, according to the present invention, because the digital data which are sent out from the sender terminal apparatus and separated into the synchronizing signals and the compressed data can be transmitted in the form of integrated block data to the destination terminal apparatus via the data transmission line and also the digital data can be received in the form of integrated block data via the data transmission line, smooth data exchange can be implemented in real time between any terminal apparatuses even if the data transmission line having relatively smaller transmission capacity is employed than those in the inventions set forth in claims 1 to 3 is employed.

Also, even if the data transmission line having low speed and relatively small transmission capacity is employed, the compressed data can be exchanged concurrently in parallel, for example, between plural image information sources, plural monitors, etc.

In addition, since the asynchronous mode which is advantageous to real-time transmission is employed as the media access control system, multimedia data including sound, moving picture, etc. for which the real-time processing is required can be transmitted in real time without delay.

In order to achieve the above object of the present invention, in a communication method for use in a communication system which is constructed by connecting a plurality of communication apparatuses, to which one or more than two terminal apparatuses are connected respectively, via a data transmission line and in which an asynchronous mode is employed as a media access control system, the communication method carried out by any one sender communication apparatus, to which a sender terminal apparatus is connected, of the plurality of communication apparatuses, comprising the steps of: converting a synchronizing signal of digital data into block synchronizing signals which consist of a start signal indicating head position of bit stream data and an end signal indicating end position thereof, the digital data being sent out from the sender terminal apparatus and separated into the synchronizing signal and the bit stream data; multiplexing the bit stream data and the converted block synchronizing signals in terms of modulation process not to be overlapped on a time base respectively to thus generate block data; and transmitting the generated block data to one or more than two destination terminal apparatuses via the data transmission line.

According to the present invention, the sender communication apparatus can convert a synchronizing signal of digital data into block synchronizing signals which consist of a start signal indicating head position of bit stream data and an end signal indicating end position thereof, and the digital data are sent out from the sender terminal apparatus and separated into the synchronizing signal and the bit stream data, then multiplex the bit stream data and the converted block synchronizing signals in terms of modulation process not to be overlapped on a time base respectively to thus generate block data, and then transmit the generated block data to one or more than two destination terminal apparatuses via the data transmission line.

Therefore, the sender communication apparatus can transmit the digital data which are sent out from the sender terminal apparatus and separated into the synchronizing signals and the bit stream data are transmitted in the form of integrated block data to the destination terminal apparatus via the data transmission line. Hence, smooth data exchange can be implemented in real time between any terminal apparatuses even if the data transmission line having relatively small transmission capacity is employed.

In addition, since the asynchronous mode which is advantageous to real-time transmission can be employed as the media access control system, multimedia data including sound, moving picture, etc. for which the real-time processing is required can be transmitted in real time without delay.

In order to achieve the above object of the present invention, in a communication method for use in a communication system which is constructed by connecting a plurality of communication apparatuses, to which one or more than two terminal apparatuses are connected respectively, via a data transmission line and in which an asynchronous mode is employed as a media access control system, the communication method carried out by a destination communication apparatus, to which a destination terminal apparatus is connected, of the plurality of communication apparatuses, comprising the steps of: receiving block data via the data transmission line, the block data being generated by executing modulation process to multiplex bit stream data which are sent out from the sender terminal apparatus and block synchronizing signals which consist of a start signal indicating head position of the bit stream data and an end signal indicating end position thereof; inverse-multiplexing the received block data in terms of demodulation process to distribute individually the block synchronizing signals and the bit stream data respectively; and demodulating the distributed block synchronizing signals into synchronizing signals of the bit stream data, and then sending out the demodulated synchronizing signals and the bit stream data to the destination terminal apparatus.

According to the present invention, the destination communication apparatus receiving means can receive the block data via the data transmission line, the block data being generated by executing modulation process to multiplex bit stream data which are sent out from the sender terminal apparatus and block synchronizing signals which consist of a start signal indicating head position of the bit stream data and an end signal indicating end position thereof, then inverse-multiplex the received block data in terms of demodulation process to distribute individually the block synchronizing signals and the bit stream data respectively, then demodulate the distributed block synchronizing signals into synchronizing signals of the bit stream data, and then send out the demodulated synchronizing signals and the bit stream data to the destination terminal apparatus.

Therefore, the destination communication apparatus can receive the digital data in the form of integrated block data via the data transmission line. Hence, smooth data exchange can be implemented in real time between any terminal apparatuses even if the data transmission line having relatively small transmission capacity is employed.

In addition, since the asynchronous mode which is advantageous to real-time transmission is employed as the media access control system, multimedia data including sound, moving picture, etc. for which the real-time processing is required can be transmitted in real time without delay.

In order to achieve the above object of the present invention, in a communication method for use in a communication system which is constructed by connecting a plurality of communication apparatuses, to which one or more than two terminal apparatuses are connected respectively, via a data transmission line and in which an asynchronous mode is employed as a media access control system, the communication method carried out by any one sender communication apparatus, to which a sender terminal apparatus is connected, of the plurality of communication apparatuses, comprising the steps of: converting a synchronizing signal of digital data into block synchronizing signals which consist of a start signal indicating head position of bit stream data and an end signal indicating end position thereof, the digital data being sent out from the sender terminal apparatus and separated into the synchronizing signal and the bit stream data; multiplexing the bit stream data and the converted block synchronizing signals in terms of modulation process not to be overlapped on a time base respectively to thus generate block data; and transmitting the generated block data to one or more than two destination terminal apparatuses via the data transmission line; and the communication method carried out by a destination communication apparatus, to which a destination terminal apparatus is connected, of the plurality of communication apparatuses, comprising the steps of: receiving the block data sent out from the sender communication apparatus via the data transmission line; inverse-multiplexing the received block data in terms of demodulation process to distribute individually the block synchronizing signals and the bit stream data respectively; and demodulating the distributed block synchronizing signals into synchronizing signals of the bit stream data, and then sending out the demodulated synchronizing signals and the bit stream data to the destination terminal apparatus.

According to the present invention, at the time when the digital data which are sent out from the sender terminal apparatus are transmitted to the destination terminal apparatus, the sender communication apparatus can first convert the synchronizing signal of the digital data into block synchronizing signals which consist of the start signal indicating head position of bit stream data and the end signal indicating end position thereof, the digital data being sent out from the sender terminal apparatus and separated into the synchronizing signal and the bit stream data, then multiplex the bit stream data and the converted block synchronizing signals in terms of modulation process not to be overlapped on a time base respectively to thus generate integrated block data, and then transmit such generated integrated block data to the destination terminal apparatus via the data transmission line.

Then, at the time when the block data which are transmitted from the sender communication apparatus are sent out to the destination terminal apparatus, the destination communication apparatus can first receive the block data transmitted from the sender communication apparatus via the data transmission line, then inverse-multiplex the received block data in terms of demodulation process to distribute individually the block synchronizing signals and the bit stream data respectively, and then demodulate the distributed block synchronizing signals into synchronizing signals of the bit stream data and then send out the demodulated synchronizing signals and the bit stream data to the destination terminal apparatus.

Therefore, the sender communication apparatus can transmit the digital data which are sent out from the sender terminal apparatus and separated into the synchronizing signals and the bit stream data in the form of integrated block data to the destination terminal apparatus via the data transmission line, and the destination communication apparatus can receive the digital data in the form of integrated block data from the sender communication apparatus via the data transmission line. Hence, smooth data exchange can be implemented in real time between any terminal apparatuses even if the data transmission line having relatively small transmission capacity is employed.

In addition, since the asynchronous mode which is advantageous to real-time transmission is employed as the media access control system, multimedia data including sound, moving picture, etc. for which the real-time processing is required can be transmitted in real time without delay.

In order to achieve the above object of the present invention, in a communication method for use in a communication system which is constructed by connecting a plurality of communication apparatuses, to which one or more than two terminal apparatuses are connected respectively, via a data transmission line and in which an asynchronous mode is employed as a media access control system, the communication method carried out by any one sender communication apparatus, to which a sender terminal apparatus is connected, of the plurality of communication apparatuses, comprising the steps of: converting a synchronizing signal of digital data into block synchronizing signals which consist of a start signal indicating head position of compressed bit stream data as compressed data and an end signal indicating end position thereof, the digital data being sent out from the sender terminal apparatus and separated into the synchronizing signal and the compressed data; multiplexing the compressed data and the converted block synchronizing signals in terms of modulation process not to be overlapped on a time base respectively to thus generate block data; and transmitting the generated block data to one or more than two destination terminal apparatuses via the data transmission line; and the communication method carried out by a destination communication apparatus, to which a-destination terminal apparatus is connected, of the plurality of communication apparatuses, comprising the steps of: receiving the block data sent out from the sender communication apparatus via the data transmission line; inverse-multiplexing the received block data in terms of demodulation process to distribute individually the block synchronizing signals and the compressed data respectively; and demodulating the distributed block synchronizing signals into synchronizing signals of the compressed data, and then sending out the demodulated synchronizing signals and the compressed data to the destination terminal apparatus.

According to the present invention, at the time when the digital data which are sent out from the sender terminal apparatus are transmitted to the destination terminal apparatus, the sender communication apparatus can first convert the synchronizing signal of the digital data into block synchronizing signals which consist of the start signal indicating head position of compressed data and the end signal indicating end position thereof, the digital data being sent out from the sender terminal apparatus and separated into the synchronizing signal and the compressed data, then multiplex the compressed data and the converted block synchronizing signals in terms of modulation process not to be overlapped on a time base respectively to thus generate integrated block data, and then transmit such generated integrated block data to the destination terminal apparatus via the data transmission line.

Then, at the time when the block data which are transmitted from the sender communication apparatus are sent out to the destination terminal apparatus, the destination communication apparatus can first receive the block data transmitted from the sender communication apparatus via the data transmission line, then inverse-multiplex the received block data in terms of demodulation process to distribute individually the block synchronizing signals and the compressed data respectively, and then demodulate the distributed block synchronizing signals into synchronizing signals of the compressed data and then send out the demodulated synchronizing signals and the compressed data to the destination terminal apparatus.

Therefore, the sender communication apparatus can transmit the digital data which are sent out from the sender terminal apparatus and separated into the synchronizing signals and the compressed data in the form of integrated block data to the destination terminal apparatus via the data transmission line, and the destination communication apparatus can receive the digital data in the form of integrated block data from the sender communication apparatus via the data transmission line. Hence, smooth data exchange can be implemented in real time between any terminal apparatuses even if the data transmission line having relatively smaller transmission capacity than those in the inventions set forth in claims 5 to 7 is employed.

In addition, since the asynchronous mode which is advantageous to real-time transmission is employed as the media access control system, multimedia data including sound, moving picture, etc. for which the real-time processing is required can be transmitted in real time without delay.

In order to achieve the above object of the present invention, in a communication system which is constructed by connecting a plurality of communication apparatuses, to which one or more than two terminal apparatuses are connected respectively, via a data transmission line and in which an asynchronous mode is employed as a media access control system, any one sender communication apparatus, to which a sender terminal apparatus is connected, of the plurality of communication apparatuses, comprising: synchronous modulating means for converting a synchronizing signal of digital data into block synchronizing signals which consist of a start signal indicating head position of bit stream data and an end signal indicating end position thereof, the digital data being sent out from the sender terminal apparatus and separated into the synchronizing signal and the bit stream data; multiplexing means for multiplexing the bit stream data and the block synchronizing signals converted by the synchronous modulating means in terms of modulation process not to be overlapped on a time base respectively to thus generate block data; and transmitting means for transmitting the block data generated by the multiplexing means to one or more than two destination terminal apparatuses via the data transmission line.

According to the present invention, in the sender communication apparatus, first the synchronous modulating means can convert a synchronizing signal of digital data into block synchronizing signals which consist of a start signal indicating head position of bit stream data and an end signal indicating end position thereof, the digital data are sent out from the own sender terminal apparatus and separated into the synchronizing signal and the bit stream data. Next, the multiplexing means can multiplex the bit stream data and the block synchronizing signals converted by the synchronous modulating means in terms of modulation process not to be overlapped on a time base respectively to thus generate block data. And, the transmitting means can transmit the block data generated by the multiplexing means to one or more than two destination terminal apparatuses via the data transmission line.

Therefore, the sender communication apparatus can transmit the digital data which are sent out from the sender terminal apparatus and separated into the synchronizing signals and the bit stream data in the form of integrated block data to the destination terminal apparatus via the data transmission line. Hence, smooth data exchange can be implemented in real time between any terminal apparatuses even if the data transmission line having relatively small transmission capacity is employed.

In addition, since the asynchronous mode which is advantageous to real-time transmission can be employed as the media access control system, multimedia data including sound, moving picture, etc. for which the real-time processing is required can be transmitted in real time without delay.

In order to achieve the above object of the present invention, in a communication system which is constructed by connecting a plurality of communication apparatuses, to which one or more than two terminal apparatuses are connected respectively, via a data transmission line and in which an asynchronous mode is employed as a media access control system, a destination communication apparatus, to which a destination terminal apparatus is connected, of the plurality of communication apparatuses, comprising: receiving means for receiving block data via the data transmission line, the block data being generated by executing modulation process to multiplex bit stream data which are sent out from a sender terminal apparatus and block synchronizing signals which consist of a start signal indicating head position of the bit stream data and an end signal indicating end position thereof; inverse multiplexing means for inverse-multiplexing the block data received by the receiving means in terms of demodulation process to distribute individually the block synchronizing signals and the bit stream data respectively; and synchronous demodulating means for demodulating the block synchronizing signals distributed by the inverse multiplexing means into synchronizing signals of the bit stream data and then sending out the demodulated synchronizing signals and the bit stream data to the own destination terminal apparatus.

According to the present invention, in the destination communication apparatus, first the receiving means can receive the block data via the data transmission line, the block data are generated by executing modulation process to multiplex bit stream data which are sent out from the sender terminal apparatus and block synchronizing signals which consist of a start signal indicating head position of the bit stream data and an end signal indicating end position thereof. Next, the inverse multiplexing means can inverse-multiplex the block data received by the receiving means in terms of demodulation process to distribute individually the block synchronizing signals and the bit stream data respectively. And, the synchronous demodulating means can demodulate the block synchronizing signals distributed by the inverse multiplexing means into synchronizing signals of the bit stream data, and then send out the demodulated synchronizing signals and the bit stream data to the destination terminal apparatus.

Therefore, the destination communication apparatus can receive the digital data in the form of integrated block data from the sender communication apparatus via the data transmission line. Hence, smooth data exchange can be implemented in real time between any terminal apparatuses even if the data transmission line having relatively small transmission capacity is employed.

In addition, since the asynchronous mode which is advantageous to real-time transmission is employed as the media access control system, multimedia data including sound, moving picture, etc. for which the real-time processing is required can be transmitted in real time without delay.

In order to achieve the above object of the present invention, in a communication system which is constructed by connecting a plurality of communication apparatuses, to which one or more than two terminal apparatuses are connected respectively, via a data transmission line and in which an asynchronous mode is employed as a media access control system, any one sender communication apparatus, to which a sender terminal apparatus is connected, of the plurality of communication apparatuses, comprising: synchronous modulating means for converting a synchronizing signal of digital data into block synchronizing signals which consist of a start signal indicating head position of bit stream data and an end signal indicating end position thereof, the digital data being sent out from the sender terminal apparatus and separated into the synchronizing signal and the bit stream data; multiplexing means for multiplexing the bit stream data and the block synchronizing signals converted by the synchronous modulating means in terms of modulation process not to be overlapped on a time base respectively to thus generate block data; and transmitting means for transmitting the block data generated by the multiplexing means to one or more than two destination terminal apparatuses via the data transmission line; and a destination communication apparatus, to which a destination terminal apparatus is connected, of the plurality of communication apparatuses, comprising: receiving means for receiving block data sent out from the sender communication apparatus via the data transmission line; inverse multiplexing means for inverse-multiplexing the block data received by the receiving means in terms of demodulation process to distribute individually the block synchronizing signals and the bit stream data respectively; and synchronous demodulating means for demodulating the block synchronizing signals distributed by the inverse multiplexing means into synchronizing signals of the bit stream data and then sending out the demodulated synchronizing signals and the bit stream data to the own destination terminal apparatus.

According to the present invention, in the sender communication apparatus, first the synchronous modulating means can convert a synchronizing signal of digital data into block synchronizing signals which consist of a start signal indicating head position of bit stream data and an end signal indicating end position thereof, the digital data are sent out from the own sender terminal apparatus and separated into the synchronizing signal and the bit stream data. Next, the multiplexing means can multiplex the bit stream data and the block synchronizing signals converted by the synchronous modulating means in terms of modulation process not to be overlapped on a time base respectively to thus generate block data. And, the transmitting means can transmit the block data generated by the multiplexing means to one or more than two destination terminal apparatuses via the data transmission line.

Then, in the destination communication apparatus, first the receiving means can receive the block data sent out from the sender communication apparatus via the data transmission line. Next, the inverse multiplexing means can inverse-multiplex the block data received by the receiving means in terms of demodulation process to distribute individually the block synchronizing signals and the bit stream data respectively. And, the synchronous demodulating means can demodulate the block synchronizing signals distributed by the inverse multiplexing means into synchronizing signals of the bit stream data, and then send out the demodulated synchronizing signals and the bit stream data to the destination terminal apparatus.

Therefore, the sender communication apparatus can transmit the digital data which are sent out from the sender terminal apparatus and separated into the synchronizing signals and the bit stream data in the form of integrated block data to the destination terminal apparatus via the data transmission line, and the destination communication apparatus can receive the digital data in the form of integrated block data from the sender communication apparatus via the data transmission line. Hence, smooth data exchange can be implemented in real time between any terminal apparatuses even if the data transmission line having relatively small transmission capacity is employed.

In addition, since the asynchronous mode which is advantageous to real-time transmission can be employed as the media access control system, multimedia data including sound, moving picture, etc. for which the real-time processing is required can be transmitted in real time without delay.

In order to achieve the above object of the present invention, in a communication system which is constructed by connecting a plurality of communication apparatuses, to which one or more than two terminal apparatuses are connected respectively, via a data transmission line and in which an asynchronous mode is employed as a media access control system, any one sender communication apparatus, to which a sender terminal apparatus is connected, of the plurality of communication apparatuses, comprising: synchronous modulating means for converting a synchronizing signal of digital data into block synchronizing signals which consist of a start signal indicating head position of compressed bit stream data as compressed data and an end signal indicating end position thereof, the digital data being sent out from the sender terminal apparatus and separated into the synchronizing signal and the compressed data; multiplexing means for multiplexing the compressed data and the block synchronizing signals converted by the synchronous modulating means in terms of modulation process not to be overlapped on a time base respectively to thus generate block data; and transmitting means for transmitting the block data generated by the multiplexing means to one or more than two destination terminal apparatuses via the data transmission line; and a destination communication apparatus, to which a destination terminal apparatus is connected, of the plurality of communication apparatuses, comprising: receiving means for receiving the block data sent out from the sender communication apparatus via the data transmission line; inverse multiplexing means for inverse-multiplexing the block data received by the receiving means in terms of demodulation process to distribute individually the block synchronizing signals and the compressed data respectively; and synchronous demodulating means for demodulating the block synchronizing signals distributed by the inverse multiplexing means into synchronizing signals of the compressed data, and then sending out the demodulated synchronizing signals and the compressed data to the destination terminal apparatus.

According to the present invention, in the sender communication apparatus, first the synchronous modulating means can convert a synchronizing signal of digital data into block synchronizing signals which consist of a start signal indicating head position of compressed data and an end signal indicating end position thereof, the digital data are sent out from the sender terminal apparatus and separated into the synchronizing signal and the compressed data. Next, the multiplexing means can multiplex the compressed data and the block synchronizing signals converted by the synchronous modulating means in terms of modulation process not to be overlapped on a time base respectively to thus generate block data. And, the transmitting means can transmit the block data generated by the multiplexing means to one or more than two destination terminal apparatuses via the data transmission line.

Then, in the destination communication apparatus, first the receiving means can receive the block data sent out from the sender communication apparatus via the data transmission line. Next, the inverse multiplexing means can inverse-multiplex the block data received by the receiving means in terms of demodulation process to distribute individually the block synchronizing signals and the compressed data respectively. And, the synchronous demodulating means can demodulate the block synchronizing signals distributed by the inverse multiplexing means into synchronizing signals of the compressed data, and then send out the demodulated synchronizing signals and the compressed data to the destination terminal apparatus.

Therefore, the sender communication apparatus can transmit the digital data which are sent out from the sender terminal apparatus and separated into the synchronizing signals and the compressed data in the form of integrated block data to the destination terminal apparatus via the data transmission line, and the destination communication apparatus can receive the digital data in the form of integrated block data from the sender communication apparatus via the-data transmission line. Hence, smooth data exchange can be implemented in real time between any terminal apparatuses even if the data transmission line having relatively smaller transmission capacity than those in the inventions set forth in claims 9 to 11 is employed.

Also, even if the data transmission line having low speed and relatively small transmission capacity is employed, the compressed data can be exchanged concurrently in parallel, for example, between plural image information sources, plural monitors, etc.

Further, since the digital data including the compressed data and the synchronizing signals of the compressed data can be communicated in the form of integrated block data between any terminal apparatuses via the data transmission line, it is feasible easily to accomplish simplification of the data transmission line and centralization process of the digital data.

Furthermore, since the asynchronous mode which is advantageous to real-time transmission can be employed as the media access control system, multimedia data including sound, moving picture, etc. for which the real-time processing is required can be transmitted in real time without delay.

The nature, principle and utility of the invention will become more apparent from the following detailed description when read in conjunction with the accompanying drawings.

DESCRIPTION OF THE PREFERRED EMBODIMENTS

A communication method and a communication system according to embodiments of the present invention will be explained in detail with reference to accompanying drawings hereinbelow.

Figure 1:
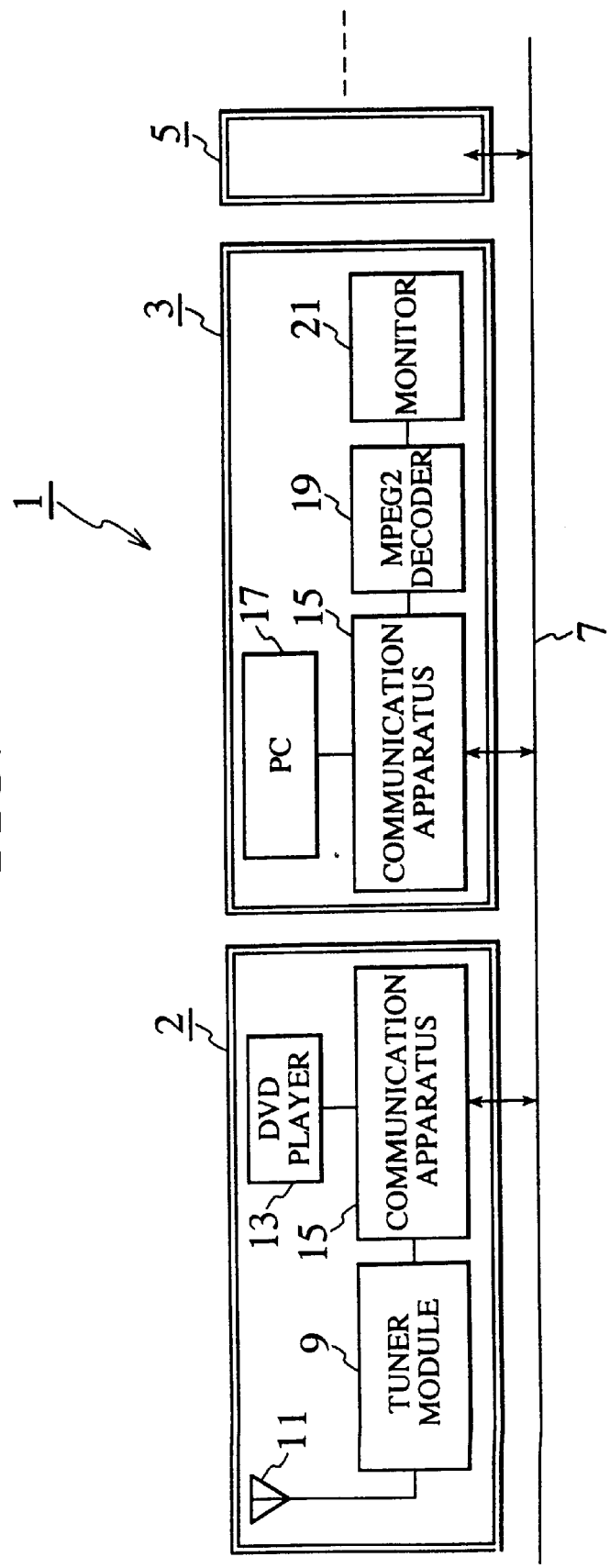
FIG. 1 is a view showing a configuration of a communication system according to a first embodiment of the present invention.

As shown in FIG. 1, a communication system 1 according to a first embodiment of the present invention is constructed by connecting, via a bus system data transmission line 7, a plurality of stations 2, 3, 5, . . . which comprise one or more than two terminal apparatuses such as tuner module 9, etc., and one communication apparatus 15 to which the terminal apparatuses are connected respectively. Also, the communication system 1 is constructed by connecting any communication apparatuses 15, any terminal apparatuses, or any communication apparatus 15 and the terminal apparatus via the data transmission line 7 so as to enable data exchange.

The technical background of the communication system according to the present invention will be explained hereunder. Normally, in order to prevent collision of communication frames in the digital form being sent out from respective stations 2, 3, 5, . . . , and ensure data transmission, access rules used to access from respective stations 2, 3, 5, . . . to the data transmission line 7 are defined previously in the communication system 1. These access rules are called "media access control systems". The media access control systems are mainly classified into a synchronous mode in which the communication frames are sent out from respective stations 2, 3, 5, . . . in synchronism with a particular clock signal, and an asynchronous mode in which the communication frames are sent out without the particular clock signal. As the media access control system of the asynchronous mode, there are some switching systems, for example, a packet switching system employing a packet which is constructed by adding header information such as an address to digital data having an appropriate length as an information transmission unit, an ATM (Asynchronous Transfer Mode) employing a relatively small fixed-length packet which is divided on a time base and called a "cell" as an information transmission unit, and so on.

A technology of the present invention is directed to communication systems which employ the asynchronous modes such as the packet switching system, the asynchronous transfer mode (ATM), etc. as the media access control system. Among plural communication apparatuses to which one or more than two terminal apparatuses such as the tuner module 9, a DVD player 13, etc. are connected respectively, sender communication apparatuses to which sender terminal apparatuses are connected respectively can receive synchronizing signals and bit stream data from the sender terminal apparatuses individually, then generate block data by effecting a modulation process which multiplexes the synchronizing signals and the bit stream data not to be overlapped on a time base, and then transmit the block data to one or more than two destination terminal apparatuses. On the contrary, destination communication apparatuses to which destination terminal apparatuses are connected respectively can receive the block data transmitted from the sender communication apparatuses, then separate the synchronizing signals and the bit stream data by executing inverse multiplexing process of the received block data individually to extract them separately, and then transmit the synchronizing signals and the bit stream data to the destination terminal apparatus such as a personal computer (PC) 17, a monitor 21, etc.

As described later, the following approaches may be considered, for example, as an approach to transmit the block data from the sender terminal apparatus to a particular destination terminal apparatus. That is, the sender communication apparatus to which the sender terminal apparatus is connected can add the header information including destination and sender to the block data and then transmit such block data, whereas other communication apparatuses when received the block data can determine whether or not their own terminal apparatus is designated as a destination, and then receive only the block data in which own terminal apparatus is designated as the destination. Otherwise, a communication route is secured in advance between the sender terminal apparatus and the destination terminal apparatus and then the block data are transmitted via the communication route.

Regardless of the above approach to transmit the block data from the sender terminal apparatus to the destination terminal apparatus, the communication system according to the first embodiment of the present invention can be applied to a broad range. The gist of the present invention resides in that, even if a data transmission line having a relatively small transmission capacity is employed, smooth data exchange of digital data, which are sent out from the sender terminal apparatus and separated into the synchronizing signals and the bit stream data, can be achieved in real time between any terminal apparatuses by converting the synchronizing signals into block synchronizing signals which consist of a start signal indicating head position of the bit stream data and an end signal indicating end position thereof and also converting the bit stream data and the converted block synchronizing, signals into the form of block data by multiplexing them not to be overlapped on a time base, and then transmitting the block data to the destination terminal apparatus via the data transmission line 7.

In addition, the gist of the communication system according to the present invention resides in that, even if the data transmission line having a relatively small transmission capacity is employed, smooth data exchange of digital data, which are sent out from the sender terminal apparatus and separated into the synchronizing signals and compressed data as the compressed bit stream data, can be achieved in real time between any terminal apparatuses by converting the synchronizing signals into the block synchronizing signals which consist of the start signal indicating head position of the bit stream data and the end signal indicating end position thereof and also converting the compressed data and the converted block synchronizing signals into the form of block data by multiplexing them not to be overlapped on a time base, and then transmitting the block data to the destination terminal apparatus via the data transmission line 7.

A configuration of the communication system 1 according to the present invention will be explained in more detail hereunder. A first station 2 out of plural stations 2, 3, 5, . . . comprises an antenna 11 for receiving satellite radio waves transmitted from a communication satellite (not shown); a tuner module 9 for receiving, via the antenna 11, fixed-length packet switching data to which header information including synchronizing signals such as a packet synchronizing signal, an enable signal, a data clock signal, etc., for example, are added, then decoding header information added to the received packet switching data, and then sending out individually the synchronizing signals and the bit stream data being separated and output by the above decoding operation; a DVD player 13 for decoding packet switching data reproduced from a DVD (Digital Video Disc) and then sending out individually the synchronizing signals and the bit stream data separated and output by the above decoding operation; and a communication apparatus 15 for receiving the digital data which are sent out from the sender terminal apparatus such as the tuner module 9, the DVD player 13, etc. and separated into the synchronizing signals and the bit stream data respectively, then converting the received synchronizing signals into the block synchronizing signals which consist of the start signal S indicating head position of the bit stream data and the end signal E indicating end position thereof, then generating the block data by applying modulation process which multiplexes mutual data not to be overlapped on a time base to the header information H such as bit stream data, block synchronizing signals, sender and destination, etc., and then transmitting the block data to the destination terminal apparatus via the data transmission line 7, and also by receiving the block data transmitted from other stations via the data transmission line 7, then extracting individually the synchronizing signals, the bit stream data, and the header information H by executing demodulation process to inverse-multiplex the received block data, and then sending out the synchronizing signals and the bit stream data to the destination terminal apparatus being connected to own terminal apparatus.

Similarly, the second station 3 comprises the above mentioned communication apparatus 15; a personal computer (PC) 17 equipped with an information storing unit such as a hard disc memory unit to store the bit stream data input from the communication apparatus 15, for executing various digital processes such as moving picture editing of stored bit stream data; an MPEG2 decoder 19 for expanding compressed bit stream data input from the communication apparatus 15 according to the standard of MPEG2; and a monitor 21 for converting the digital data expanded by the MPEG2 decoder 19 into suitable analog signals to reproduce video, sound, etc.

Figure 2:
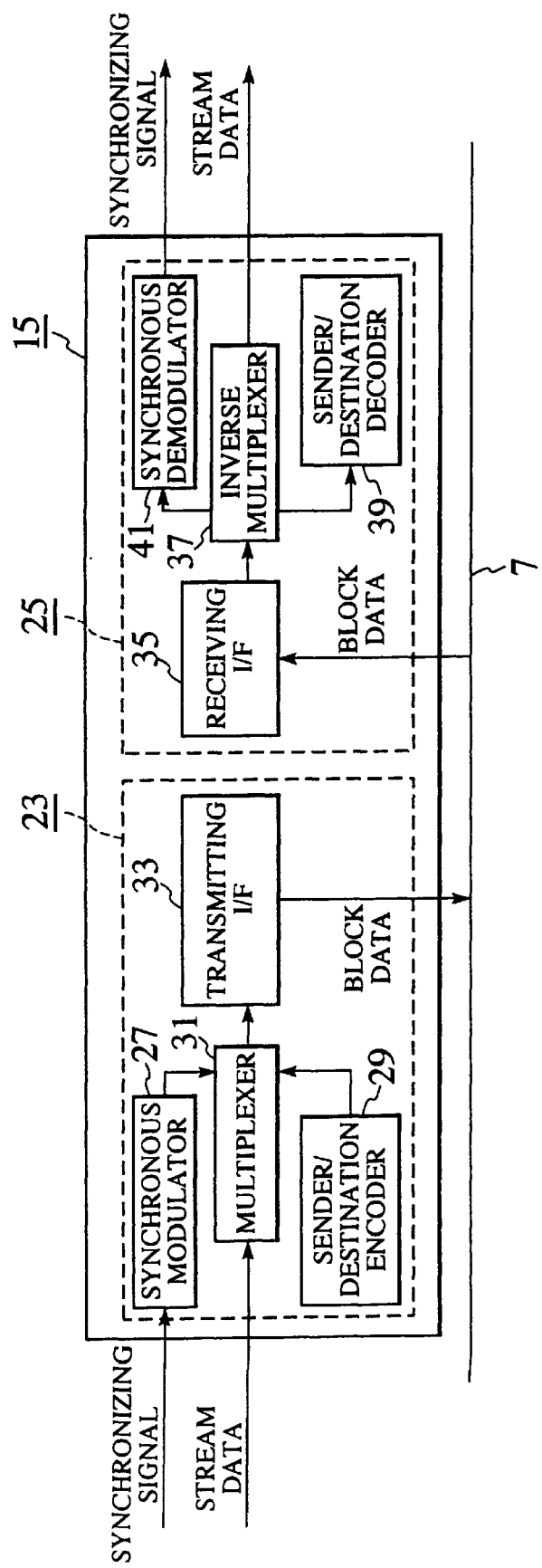
FIG. 2 is a block circuit diagram showing a configuration of a communication apparatus constituting the communication system according to the first embodiment of the present invention.
Figure 3A:
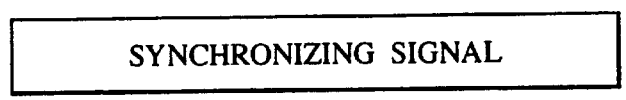
FIGS. 3A to 3F are views explaining an operation of the communication apparatus constituting the communication system according to the first embodiment of the present invention.
Figure 3B:
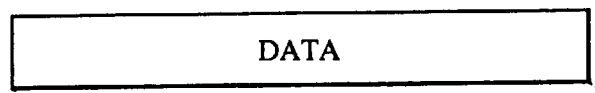
Figure 3C:
Figure 3D:
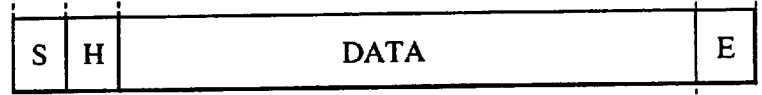
Figure 3E:
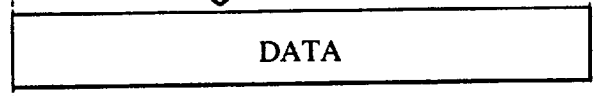
Figure 3F:
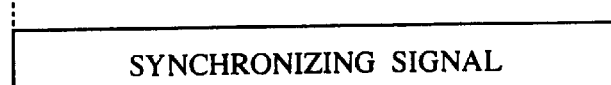

Next, an internal configuration of the communication apparatus 15 will be explained with reference to FIG. 2 hereunder. The communication apparatus 15 is constructed to include a transmitter apparatus 23 and a receiver apparatus 25.

The transmitter apparatus 23 is composed of a synchronous modulator 27 for converting the synchronizing signals such as the packet synchronizing signal, the enable signal, the data clock signal, etc. which are sent out from the sender terminal apparatus such as the tuner module 9, the DVD player 13, etc. into the block synchronizing signals which consist of a start signal S indicating head position of the bit stream data and an end signal E indicating end position thereof; a sender/destination encoder 29 for generating the header information H such as destination and sender, etc. of the block data as the transmission object; a multiplexer 31 for generating the block data by applying multiplexing process to the bit stream data sent out from the transmitter terminal apparatus, the block synchronizing signal converted by the synchronous modulator 27, and the header information H generated by the sender/destination encoder 29 not to overlap mutual data on a time base; and a transmitting interface (I/F) 33 for transmitting the block data generated by the multiplexer 31 to the destination terminal apparatus via the data transmission line 7.

The receiver apparatus 25 is composed of a receiving interface (I/F) 35 for receiving the block data from other communication apparatuses via the data transmission line 7; an inverse multiplexer 37 for distributing the block synchronizing signal, the bit stream data, and the header information H individually by applying inverse-multiplexing process to the block data received by the receiving interface (I/F) 35, and outputting them; a sender/destination decoder 39 for decoding the sender and the destination from the header information H distributed by the inverse multiplexer 37; and a synchronous demodulator 41 for demodulating the block synchronizing signals distributed by the inverse multiplexer 37 into the synchronizing signals such as the packet synchronizing signal, the enable signal, the data clock signal, etc.

Subsequently, an operation of the communication system 1 constructed as above according to the present invention will be explained with reference to FIGS. 1 to 3 hereunder.

According to the communication system 1 of the first embodiment of the present invention, at the time when the digital data sent out from the sender terminal apparatus and separated into the synchronizing signal and the bit stream data are transmitted to the destination terminal apparatus, following procedures will be taken in the sender communication apparatus to which the sender terminal apparatuses such as the tuner module 9 and the DVD player 13, etc. are connected. At first, the synchronous modulator 27 can convert the synchronizing signals such as the packet synchronizing signal, the enable signal, the data clock signal, etc. input from the sender terminal apparatus and shown in FIG. 3A into the block synchronizing signals which consist of the start signal S indicating a head position of the bit stream data and the end signal E indicating end position thereof, and then output them. Then, the sender/destination encoder 29 can generate the header information H including the sender and the destination of the block data as the transmission object and then output them. Then, the multiplexer 31 can generate the block data modulated in the form shown in FIG. 3C by executing modulation process for multiplexing the bit stream data input from the sender terminal apparatus and shown in FIG. 3B, the block synchronizing signals converted by the synchronous modulator 27, and the header information H generated by the sender/destination encoder 29 not to overlap mutual data on a time base, and output them. Then, the transmitting interface (I/F) 33 can transmit the block data input from the multiplexer 31 to the destination terminal apparatus via the data transmission line 7.

On the other hand, at the time when the block data received from the sender communication apparatus via the data transmission line 7 are sent out to the destination terminal apparatus, following procedures will be taken in the destination communication apparatus to which the destination terminal apparatuses such as the personal computer (PC) 17 and the monitor 21, etc. are connected. At first, the receiving interface (I/F) 35 can receive the block data in the form shown in FIG. 3D from the sender communication apparatus via the data transmission line 7. Then, the inverse multiplexer 37 can distribute the bit stream data shown in FIG. 3E, the block synchronizing signal shown in FIG. 3F, and the header information H individually by performing demodulation process to inverse-multiplex the block data received by the receiving interface (I/F) 35, and output them. Then, the sender/destination decoder 39 can decode the sender and the destination based on the header information H distributed by the inverse multiplexer 37. In addition, the synchronous demodulator 41 can demodulate the block synchronizing signals distributed from the inverse multiplexer 37 into the synchronizing signals such as the packet synchronizing signal, the enable signal, the data clock signal, etc. and then send out them to own destination terminal apparatus.

Like the above, according to the communication system of the present invention, upon transmitting the digital data sent out from the sender terminal apparatus to the destination terminal apparatus, the sender communication apparatus can first convert the synchronizing signal of the digital data, which are sent out from the sender terminal apparatus and separated into the synchronizing signal and the bit stream data, into the block synchronizing signals which consist of the start signal S indicating head position of the bit stream data and end signal E indicating the end position thereof, then convert the bit stream data and the converted block synchronizing signal into the integrated block data by multiplexing them not to overlap on a time base, and then transmit the integrated block data to the destination terminal apparatus via the data transmission line.

On the contrary, upon receiving the block data transmitted from the sender communication apparatus by the destination terminal apparatus, the destination communication apparatus can first receive the block data transmitted from the sender communication apparatus via the data transmission line, then distribute or separate the block synchronizing signal and the bit stream data individually by executing the demodulation process to inverse-multiplex the received block data , then demodulate the distributed block synchronizing signal into the synchronizing signal for the bit stream data, and then send out the demodulated synchronizing signal and the bit stream data to the destination terminal apparatus.

As a result, since the sender communication apparatus can transmit the digital data, which are sent out from the sender terminal apparatus and separated into the synchronizing signal and the bit stream data, in the form of integrated block data to the destination terminal apparatus via the data transmission line whereas the destination communication apparatus can receive the digital data in the form of integrated block data from the sender communication apparatus via the data transmission line, smooth data exchange can be achieved between any terminal apparatuses in real time even if a data transmission line having relatively small transmission capacity is employed.

Moreover, according to the communication system of the present invention, multimedia data including sound, moving picture, and so forth which need real-time processing can be transmitted in real time without delay since the asynchronous mode which is advantageous to real-time transmission is employed as the media access control system.

Figure 5:
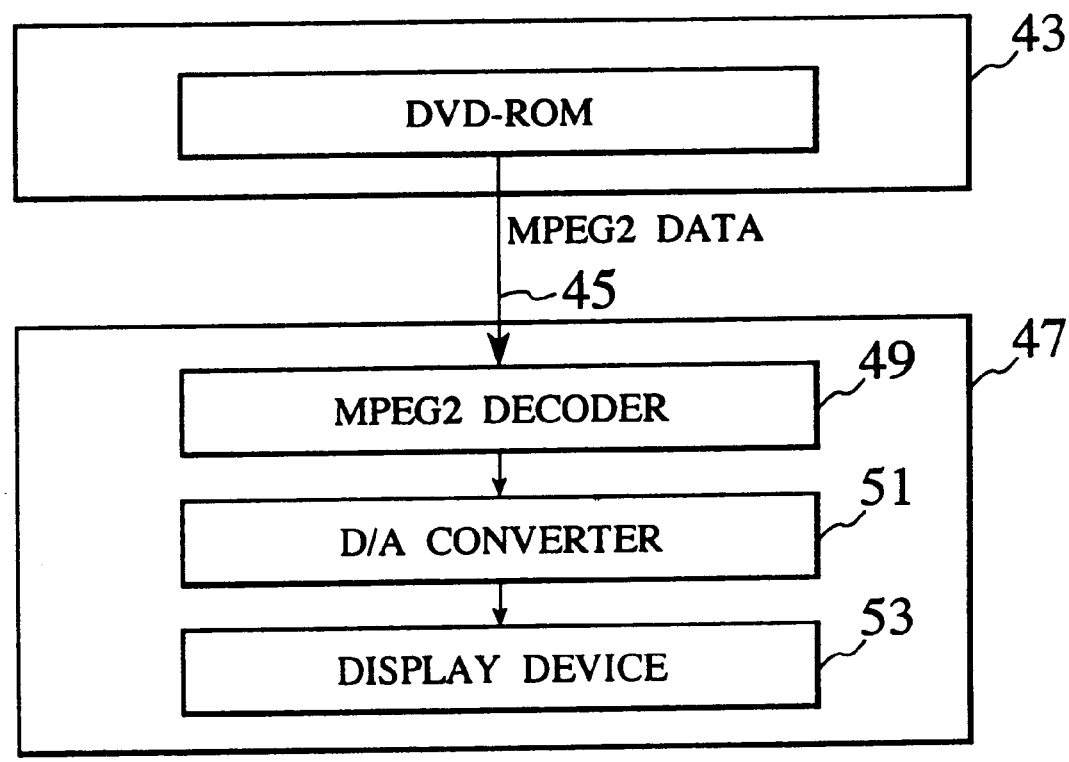
FIG. 5 is a view explaining an operation of the communication system according to the present invention.

In the communication system set forth in the first embodiment, as shown in FIG. 5, MPEG2 data which are compressed in accordance with the standard of MPEG2 and then sent out from a DVD-ROM drive 43 as the sender terminal apparatus are transmitted while maintaining the compressed MPEG2 data, without their expansion into original digital data by the MPEG2 decoder, to a video receiver 47 as the destination terminal apparatus via the data transmission line 45. On the video receiver 47 side, the compressed MPEG2 data are expanded into the original digital data by the MPEG2 decoder 49, then converted into appropriate analog data by a D/A converter 51, and then reproduced as video, sound, and the like by a display device 53 such as display in correspondence to the analog data converted. Accordingly, smooth data exchange can be achieved between any terminal apparatuses in real time and a time required for data exchange can be extremely shortened even if a data transmission line having relatively small transmission capacity is employed.

In turn, an operation of the communication system according to the first embodiment of the present invention will be explained in more detail with reference to a timing chart shown in FIG. 4 hereunder.

Figure 4:
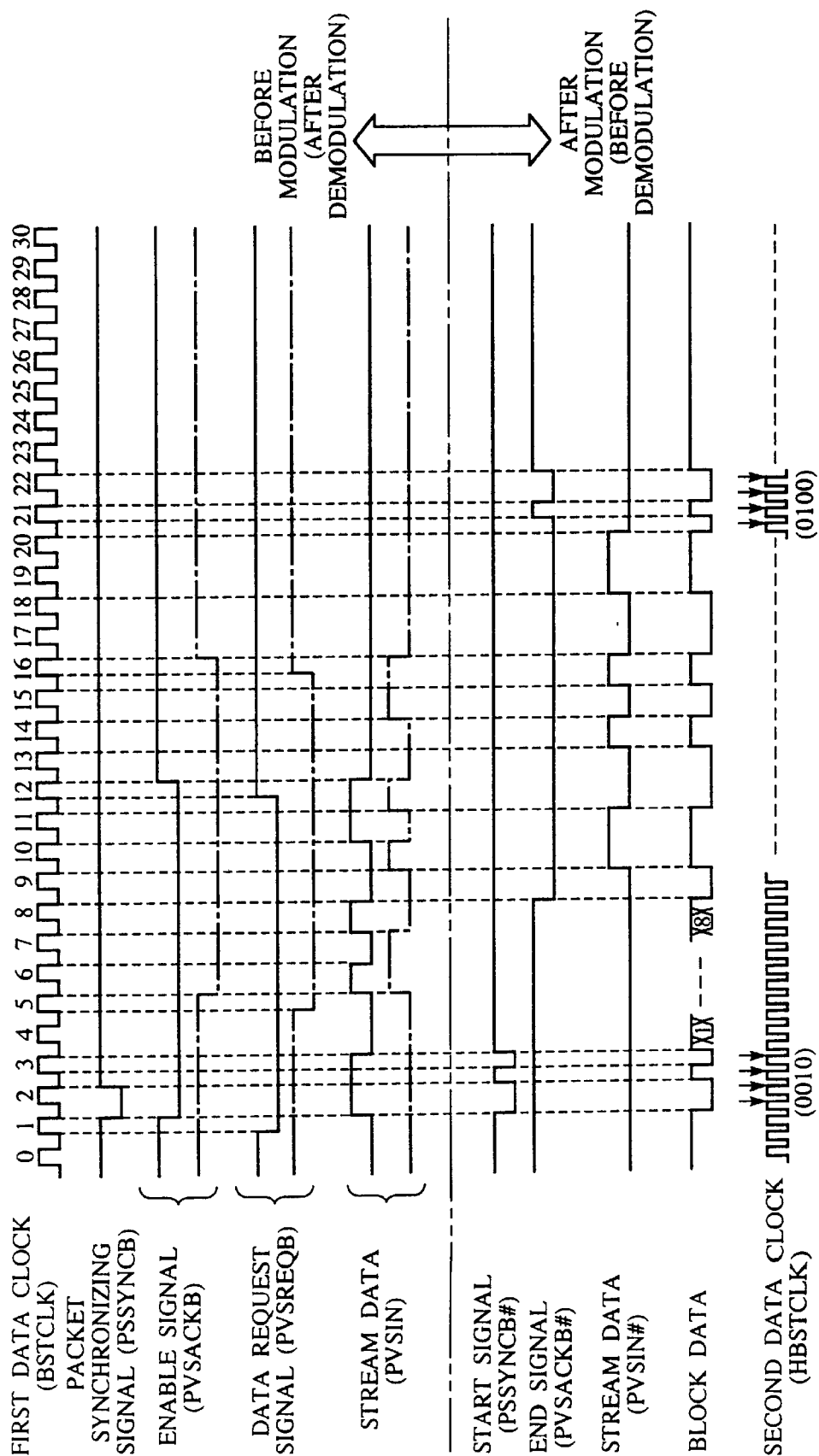
FIG. 4 is a timing chart illustrating an operation of the communication apparatus constituting the communication system according to the first embodiment of the present invention.

In FIG. 4, as various signals which are input from the sender terminal apparatus to the communication apparatus 15 before the modulation process, there are shown a first data clock BSTCLK, a packet synchronizing signal PSSYNCB, an enable signal PVSACKB, a data request signal PVSREQB, and a stream data PVSIN respectively. Further, as various signals in the communication apparatus 15 after the modulation process, there are shown a start signal PSSYNCB#, an end signal PVSACKB#, stream data PVSIN# delayed in the multiplexer 31 not to overlap mutual signals on a time base, block data modulated by multiplexing process, and a second data clock HBSTCLK having a frequency twice the first data clock BSTCLK respectively. Regarding the enable signal PVSACKB, the data request signal PVSREQB, and the stream data PVSIN in FIG. 4, signals delayed by four clocks are depicted together by dot-dash lines respectively.

The start signal PSSYNCB#, the end signal PVSACKB#, and the header information H including the sender and the destination are demodulated by use of the second data clock HBSTCLK respectively. There is shown a case where the header information H is inserted in a five bit (BSTCLK4–8) time slot. The data request signal PVSREQB employs a modulation signal which is delayed by seven clocks by use of the first data clock BSTCLK when the enable signal PVSACKB is modulated into the end signal PVSACKB#.

As the second data clock HBSTCLK used in the demodulation process, the clock signal having the frequency twice the first data clock BSTCLK has been illustrated. However, as the second data clock HBSTCLK, another clock signal which is deviated by ½ clock in phase relative to the first data clock BSTCLK may be employed other than the above clock signal.

Figure 6:
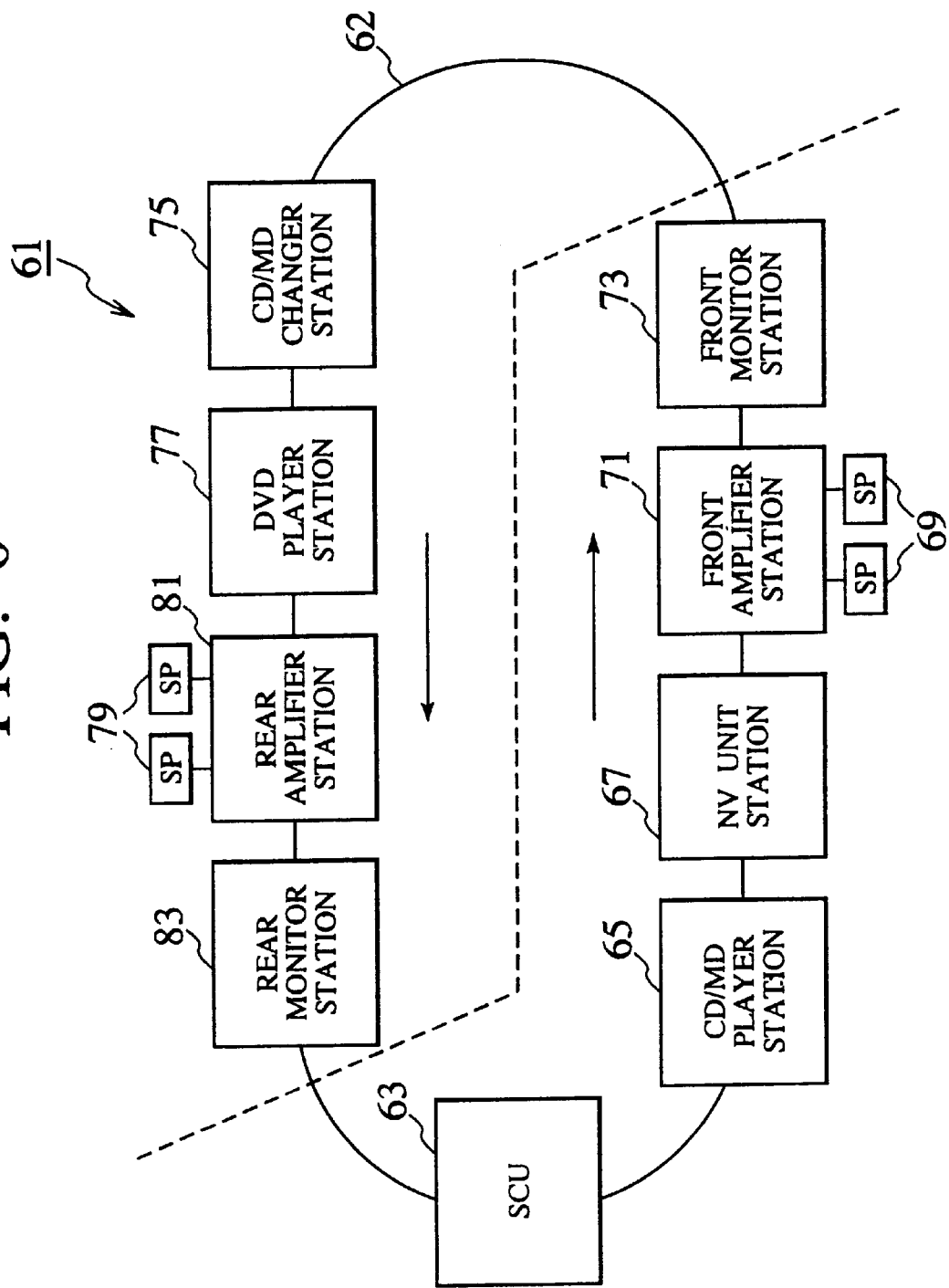
FIG. 6 is a view showing a configuration of a communication system according to a second embodiment of the present invention.

Next, a communication system 61 according to a second embodiment of the present invention will be explained with reference to FIG. 6 hereunder. The communication system 61 according to the second embodiment corresponds to an example wherein the present invention is applied to a vehicle-equipped communication system which is constructed by connecting a plurality of stations provided in respective locations of a compartment of a vehicle (not shown) via a ring data transmission line 62.

The communication system 61 according to the second embodiment of the present invention comprises, as stations provided on the driver's seat side, a system control unit (SCU) 63 for controlling and managing synchronization control, etc. in overall communication system 61; a CD/MD player station 65 for connecting a CD (Compact Disc) player and an MD (Mini Disc) player as the terminal apparatuses to the communication apparatus (not shown); an NV unit station 67 for connecting a navigation unit as the terminal apparatus to the communication apparatus (not shown); a front amplifier station 71 for connecting a front amplifier (AMP) as the terminal apparatus to which a pair of speakers (SP) 69 are connected to the communication apparatus (not shown); and a front monitor station 73 for connecting a front display monitor such as a liquid crystal display as the terminal apparatus to the communication apparatus (not shown). Also, the communication system 61 according to the second embodiment of the present invention comprises, as stations provided on the rear seat side, a CD/MD changer station 75 for connecting a CD changer and an MD changer as the terminal apparatuses to the communication apparatus (not shown); a DVD player station 77 for connecting a DVD (Digital Video Disc) video unit as the terminal apparatus to the communication apparatus (not shown); a rear amplifier station 81 for connecting a rear amplifier (AMP) as the terminal apparatus to which a pair of speakers (SP) 79 are connected to the communication apparatus (not shown); and a rear monitor station 83 for connecting a rear display monitor such as a liquid crystal display as the terminal apparatus to the communication apparatus (not shown).

Figure 7:
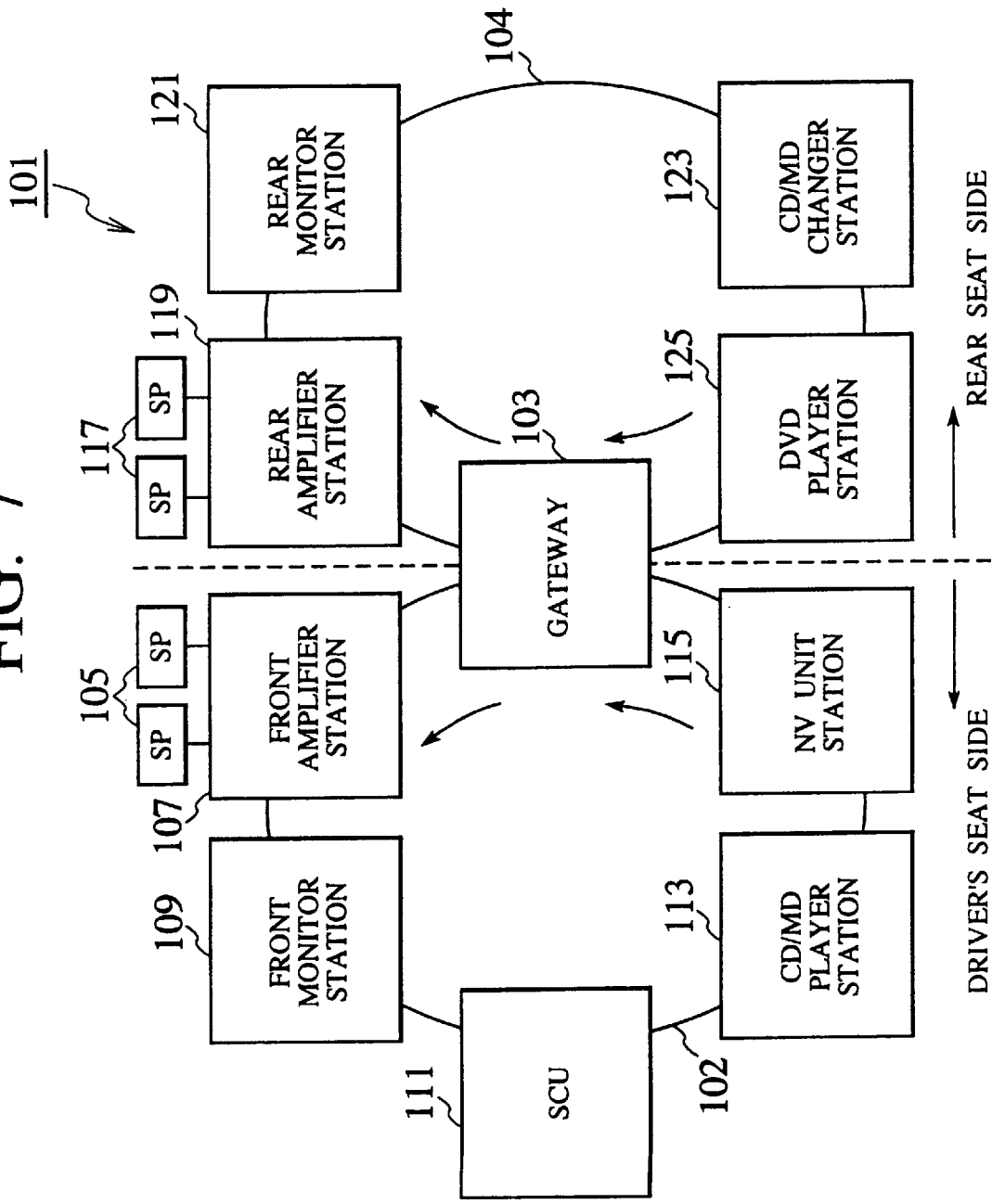
FIG. 7 is a view showing a configuration of a communication system according to a third embodiment of the present invention.

Subsequently, a communication system 101 according to a third embodiment of the present invention will be explained with reference to FIG. 7 hereunder. The communication system 101 according to the third embodiment corresponds to an example wherein the present invention is applied to a composite vehicle-equipped communication system which is constructed by connecting a pair of vehicle-equipped communication systems via a gateway 103, and the pair of vehicle-equipped communication systems are constructed by connecting a plurality of stations provided in respective locations of the compartment of the vehicle (not shown) via a pair of ring data transmission lines 102, 104 respectively.

The communication system 101 according to the third embodiment of the present invention comprises, as stations included in the vehicle-equipped communication system provided on the driver's seat side, a front amplifier station 107 for connecting a front amplifier (AMP) as the terminal apparatus to which a pair of speakers (SP) 105 are connected to the communication apparatus (not shown); a front monitor station 109 for connecting a front display monitor such as the liquid crystal display as the terminal apparatus to the communication apparatus (not shown); a system control unit (SCU) 111 for connecting controlling and managing synchronization control, etc. throughout the communication system 101; a CD/MD player station 113 for connecting the CD player and the MD player as the terminal apparatuses to the communication apparatus (not shown); and an NV unit station 115 for connecting the navigation unit as the terminal apparatus to the communication apparatus (not shown). Also, the communication system 101 according to the third embodiment of the present invention comprises, as stations included in the vehicle-equipped communication system provided on the rear seat side, a rear amplifier station 119 for connecting the rear amplifier (AMP) as the terminal apparatus to which a pair of speakers (SP) 79 are connected to the communication apparatus (not shown); a rear monitor station 121 for connecting a rear display monitor such as a liquid crystal display as the terminal apparatus to the communication apparatus (not shown); a CD/MD changer station 123 for connecting the CD changer and the MD changer as the terminal apparatuses to the communication apparatus (not shown); and a DVD player station 125 for connecting the DVD video unit as the terminal apparatus to the communication apparatus (not shown).

In the communication system according to the above second and third embodiments of the present invention, it is needless to say, like the communication system according to the first embodiment, that smooth data exchange can be achieved in real time between any terminal devices even if a data transmission line having relatively small transmission capacity is employed.

Though explained as above, the present invention is not limited to the above embodiments, but may be implemented as other embodiments by applying appropriate modification or variation.

More particularly, for example, the case has been illustrated in the third embodiment where the MPEG2 data compressed in accordance with the standard of MPEG2 are exchanged between any terminal apparatuses in the form of compressed MPEG2 data, without being demodulated into the original data by use of the MPEG2 decoder. However, the present invention is not limited to such embodiment, but another embodiment may be employed wherein the MPEG2 data sent out from the sender terminal apparatus are demodulated into the original digital data by use of the MPEG2 decoder and then data transmission to the destination terminal apparatus is executed in the form of the original digital data after demodulation.

Besides, in the third embodiment, the MPEG2 has been illustrated and explained as the compression system for the digital data which are sent out from the sender terminal apparatus. However, the present invention is not limited to such embodiment, but digital data compressed by every data compression system as well as the MPEG2 or uncompressed digital data may be handled by the present invention.

Further, in the third embodiment, the header information including appropriately the sender and the destination, synchronizing signals, or the like has been illustrated and explained as the header information. Nevertheless, the present invention is not limited to such embodiment, for example, an acknowledge character (ACK), a negative acknowledge character (NAK), command data, etc. may be added appropriately as the header information.

Furthermore, in the third embodiment, if plural destination terminal apparatuses are designated as destinations included in the header information, the digital data may be broadcasted from the sender terminal apparatus to plural destination terminal apparatus.

Moreover, in the third embodiment, for example, according to the communication system employing network topology as the bus system, a plural source data stored in different senders respectively can be simultaneously broadcasted to a plurality of destination terminal apparatuses via common data transmission lines respectively if a source data transmission line and an address transmission line are separately provided to enable time-division line switching.

In the end, the tuner module, the DVD player, the personal computer, the monitor, etc. have been illustrated as the terminal apparatus in the third embodiment, but the present invention is not limited such terminal apparatuses. It is needless to say that any terminal apparatuses which are connectable to the communication system, for example, a telephone, a CD-ROM drive, various AV devices, etc. may be employed as other terminal apparatuses in addition to the above.

What is claimed is:

1. A transmitter for transmitting digital data sent out from a sender terminal apparatus among plural terminal apparatuses to a destination terminal apparatus via a data transmission line, the plural terminal apparatuses being connected to a communication system in which an asynchronous mode is employed as a media access control system, the transmitter comprising:

synchronous modulating means for converting a synchronizing signal of digital data into block synchronizing signals including a start signal indicating a head position of bit stream data and an end signal indicating an end position thereof, the digital data being sent out from the sender terminal apparatus and separated into the synchronizing signal and the bit stream data;

multiplexing means for multiplexing the bit stream data and the block synchronizing signals converted by the synchronous modulating means in terms of a modulation process not to be overlapped on a time base respectively to generate block data; and transmitting means for transmitting the block data generated by the multiplexing means to one or more than two destination terminal apparatuses via the data transmission line.

2. A receiver for receiving digital data sent out from a sender terminal apparatus among plural terminal apparatuses via a data transmission line and then sending out the digital data to a destination terminal apparatus, the plural terminal apparatuses being connected to a communication system in which an asynchronous mode is employed as a media access control system, the receiver comprising:

receiving means for receiving block data via the data transmission line, the block data being generated by executing a modulation process to multiplex bit stream data which are sent out from the sender terminal apparatus and block synchronizing signals including a start signal indicating a head position of the bit stream data and an end signal indicating an end position thereof;

inverse multiplexing means for inverse-multiplexing the block data received by the receiving means in terms of a demodulation process to distribute individually the block synchronizing signals and the bit stream data respectively; and synchronous demodulating means for demodulating the block synchronizing signals distributed by the inverse multiplexing means into synchronizing signals of the bit stream data and then sending out the demodulated synchronizing signals and the bit stream data to the destination terminal apparatus.

3. A communication apparatus for transmitting digital data sent out from a sender terminal apparatus among plural terminal apparatuses to a destination terminal apparatus via a data transmission line, and receiving the digital data sent out from the sender terminal apparatus via the data transmission line and then sending out the digital data to another destination terminal apparatus, the plural terminal apparatuses being connected to a communication system in which an asynchronous mode is employed as a media access control system, the communication apparatus comprising:

synchronous modulating means for converting a synchronizing signal of digital data into block synchronizing signals including a start signal indicating a head position of bit stream data and an end signal indicating an end position thereof, the digital data being sent out from the sender terminal apparatus and separated into the synchronizing signal and the bit stream data;

multiplexing means for multiplexing the bit stream data and the block synchronizing signals converted by the synchronous modulating means in terms of a modulation process not to be overlapped on a time base respectively to generate block data;

transmitting means for transmitting the block data generated by the multiplexing means to one or more than two destination terminal apparatuses via the data transmission line;

receiving means for receiving the block data sent out from the sender terminal apparatus via the data transmission line;

inverse multiplexing means for inverse-multiplexing the block data received by the receiving means in terms of a demodulation process to distribute individually the block synchronizing signals and the bit stream data respectively; and synchronous demodulating means for demodulating the block synchronizing signals distributed by the inverse multiplexing means into synchronizing signals of the bit stream data and then sending out the demodulated synchronizing signals and the bit stream data to the destination terminal apparatus.

4. A communication apparatus for transmitting digital data sent out from a sender terminal apparatus among plural terminal apparatuses to a destination terminal apparatus via a data transmission line, and receiving the digital data sent out from a sender terminal apparatus among the plural terminal apparatuses via the data transmission line and then sending out the digital data to another destination terminal apparatus, the plural terminal apparatuses being connected to a communication system in which an asynchronous mode is employed as a media access control system, the communication apparatus comprising:

synchronous modulating means for converting a synchronizing signal of digital data into block synchronizing signals including a start signal indicating a head position of compressed bit stream data and an end signal indicating an end position thereof, the digital data being sent out from the sender terminal apparatus and separated into the synchronizing signal and the compressed bit stream data;

multiplexing means for multiplexing the compressed bit stream data and the block synchronizing signals converted by the synchronous modulating means in terms of a modulation process not to be overlapped on a time base respectively to generate block data;

transmitting means for transmitting the block data generated by the multiplexing means to one or more than two destination terminal apparatuses via the data transmission line;

receiving means for receiving the block data sent out from the sender terminal apparatus via the data transmission line;

inverse multiplexing means for inverse-multiplexing the block data received by the receiving means in terms of a demodulation process to distribute individually the block synchronizing signals and the compressed bit stream data respectively; and synchronous demodulating means for demodulating the block synchronizing signals distributed by the inverse multiplexing means into synchronizing signals of the compressed bit stream data and then sending out the demodulated synchronizing signals and the compressed bit stream data to the destination terminal apparatus.

5. A communication method for use in a communication system including a plurality of communication apparatuses, to which one or more than two terminal apparatuses are connected via a data transmission line and in which an asynchronous mode is employed as a media access control system, the communication method performed by any one sender communication apparatus, to which a sender terminal apparatus is connected to the plurality of communication apparatuses, and comprising the steps of:

converting a synchronizing signal of digital data into block synchronizing signals including a start signal indicating a head position of bit stream data and an end signal indicating an end position thereof, the digital data being sent out from the sender terminal apparatus and separated into the synchronizing signal and the bit stream data;

multiplexing the bit stream data and the converted block synchronizing signals in terms of a modulation process not to be overlapped on a time base respectively to generate block data; and transmitting the generated block data to one or more than two destination terminal apparatuses via the data transmission line.

6. A communication method for use in a communication system including a plurality of communication apparatuses, to which one or more than two terminal apparatuses are connected via a data transmission line and in which an asynchronous mode is employed as a media access control system, the communication method performed by a destination communication apparatus, to which a destination terminal apparatus is connected to the plurality of communication apparatuses, and comprising the steps of:

receiving block data via the data transmission line, the block data being generated by executing a modulation process to multiplex bit stream data which are sent out from the sender terminal apparatus and block synchronizing signals including a signal indicating a head position of the bit stream data and an end signal indicating an end position thereof;

inverse-multiplexing the received block data in terms of a demodulation process to distribute individually the block synchronizing signals and the bit stream data respectively; and demodulating the distributed block synchronizing signals into synchronizing signals of the bit stream data, and then sending out the demodulated synchronizing signals and the bit stream data to the destination terminal apparatus.

7. A communication method for use in a communication system including a plurality of communication apparatuses, to which one or more than two terminal apparatuses are connected via a data transmission line and in which an asynchronous mode is employed as a media access control system, the communication method performed by any one sender communication apparatus, to which a sender terminal apparatus is connected to the plurality of communication apparatuses, and comprising the steps of:

converting a synchronizing signal of digital data into block synchronizing signals including a start signal indicating a head position of bit stream data and an end signal indicating an end position thereof, the digital data being sent out from the sender terminal apparatus and separated into the synchronizing signal and the bit stream data;

multiplexing the bit stream data and the converted block synchronizing signals in terms of a modulation process not to be overlapped on a time base respectively to generate block data; and transmitting the generated block data to one or more than two destination terminal apparatuses via the data transmission line; and the communication method also performed by a destination communication apparatus, to which a destination terminal apparatus is connected to the plurality of communication apparatuses, and comprising the steps of:

receiving the block data sent out from the sender communication apparatus via the data transmission line;

inverse-multiplexing the received block data in terms of a demodulation process to distribute individually the block synchronizing signals and the bit stream data respectively; and demodulating the distributed block synchronizing signals into synchronizing signals of the bit stream data, and then sending out the demodulated synchronizing signals and the bit stream date to the destination terminal apparatus.

8. A communication method for use in a communication system including a plurality of communication apparatuses, to which one or more than two terminal apparatuses are connected via a data transmission line and in which an asynchronous mode is employed as a media access control system, the communication method performed by any one sender communication apparatus, to which a sender terminal apparatus is connected to the plurality of communication apparatuses, and comprising the steps of:

converting a synchronizing signal of digital data into block synchronizing signals including a start signal indicating a head position of compressed bit stream data as compressed data and an end signal indicating an end position thereof, the digital data being sent out from the sender terminal apparatus and separated into the synchronizing signal and the compressed data;

multiplexing the compressed data and the converted block synchronizing signals in terms of a modulation process not to be overlapped on a time base respectively to generate block data; and transmitting the generated block data to one or more than two destination terminal apparatuses via the data transmission line; and the communication method also performed by a destination communication apparatus, to which a destination terminal apparatus is connected to the plurality of communication apparatuses, and comprising the steps of:

receiving the block data sent out from the sender communication apparatus via the data transmission line;

inverse-multiplexing the received block data in terms of a demodulation process to distribute individually the block synchronizing signals and the compressed data respectively; and demodulating the distributed block synchronizing signals into synchronizing signals of the compressed data, and then sending out the demodulated synchronizing signals and the compressed data to the destination terminal apparatus.

9. A transmitter for transmitting digital data sent out from a sender terminal apparatus among plural terminal apparatuses to a destination terminal apparatus via a data transmission line, the plural terminal apparatuses being connected to a communication system in which an asynchronous mode is employed as a media access control system, the transmitter comprising:

a synchronous modulator configured to convert a synchronizing signal of digital data into block synchronizing signals including a start signal indicating a head position of bit stream data and an end signal indicating an end position thereof, the digital data being sent out from the sender terminal apparatus and separated into the synchronizing signal and the bit stream data;

a multiplexer configured to multiplex the bit stream data and the block synchronizing signals converted by the synchronous modulator in terms of a modulation process not to be overlapped on a time base respectively to generate block data; and a transmitter configured to transmit the block data generated by the multiplexing means to one or more than two destination terminal apparatuses via the data transmission line.

10. A receiver for receiving digital data sent out from a sender terminal apparatus among plural terminal apparatuses via a data transmission line and then sending out the digital data to a destination terminal apparatus, the plural terminal apparatuses being connected to a communication system in which an asynchronous mode is employed as a media access control system, the receiver comprising:

a receiver configured to receive block data via the data transmission line, the block data being generated by executing a modulation process to multiplex bit stream data which are sent out from the sender terminal apparatus and block synchronizing signals including a start signal indicating a head position of the bit stream data and an end signal indicating an end position thereof;

an inverse multiplexer configured to inverse-multiplex the block data received by the receiver in terms of a demodulation process to distribute individually the block synchronizing signals and the bit stream data respectively; and a synchronous demodulator configured to demodulate the block synchronizing signals distributed by the inverse multiplexer into synchronizing signals of the bit stream data and then sending out the demodulated synchronizing signals and the bit stream data to the destination terminal apparatus.

11. A communication apparatus for transmitting digital data sent out from a sender terminal apparatus among plural terminal apparatuses to a destination terminal apparatus via a data transmission line, and receiving the digital data sent out from the sender terminal apparatus via the data transmission line and then sending out the digital data to another destination terminal apparatus, the plural terminal apparatuses being connected to a communication system in which an asynchronous mode is employed as a media access control system, the communication apparatus comprising:

a synchronous modulator configured to convert a synchronizing signal of digital data into block synchronizing signals including a start signal indicating a head position of bit stream data and an end signal indicating an end position thereof, the digital data being sent out from the sender terminal apparatus and separated into the synchronizing signal and the bit stream data;

a multiplexer configured to multiplex the bit stream data and the block synchronizing signals converted by the synchronous modulator in terms of a modulation process not to be overlapped on a time base respectively to generate block data;

a transmitter configured to transmit the block data generated by the multiplexing means to one or more than two destination terminal apparatuses via the data transmission line;

a receiver configured to receive the block data sent out from the sender terminal apparatus via the data transmission line;

an inverse multiplexer configured to inverse-multiplex the block data received by the receiver in terms of a demodulation process to distribute individually the block synchronizing signals and the bit stream data respectively; and a synchronous demodulator configured to demodulate the block synchronizing signals distributed by the inverse multiplexer into synchronizing signals of the bit stream data and then sending out the demodulated synchronizing signals and the bit stream data to the destination terminal apparatus.

12. A communication apparatus for transmitting digital data sent out from a sender terminal apparatus among plural terminal apparatuses to a destination terminal apparatus via a data transmission line, and receiving the digital data sent out from a sender terminal apparatus among the plural terminal apparatuses via the data transmission line and then sending out the digital data to another destination terminal apparatus, the plural terminal apparatuses being connected to a communication system in which an asynchronous mode is employed as a media access control system, the communication apparatus comprising:

a synchronous modulator configured to convert a synchronizing signal of digital data into block synchronizing signals including a start signal indicating a head position of compressed bit stream data and an end signal indicating an end position thereof, the digital data being sent out from the sender terminal apparatus and separated into the synchronizing signal and the compressed bit stream data;

a multiplexer configured to multiplex the compressed bit stream data and the block synchronizing signals converted by the synchronous modulator in terms of a modulation process not to be overlapped on a time base respectively to generate block data;

a transmitter configured to transmit the block data generated by the multiplexer to one or more than two destination terminal apparatuses via the data transmission line;

a receiver configured to receive the block data sent out from the sender terminal apparatus via the data transmission line;

an inverse multiplexer configured to inverse-multiplex the block data received by the receiver in terms of a demodulation process to distribute individually the block synchronizing signals and the compressed bit stream data respectively; and a synchronous demodulator configured to demodulate the block synchronizing signals distributed by the inverse multiplexer into synchronizing signals of the compressed bit stream data and then sending out the demodulated synchronizing signals and the compressed bit stream data to the destination terminal apparatus.

\* \* \* \* \*

UNITED STATES PATENT AND TRADEMARK OFFICE
CERTIFICATE OF CORRECTION

PATENT NO. : 6,151,375
DATED : NOVEMBER 21, 2000
INVENTOR(S) : YOSHINORI NAKATSUGAWA

It is certified that error appears in the above-identified patent and that said Letters Patent is hereby corrected as shown below:

Column 2, line 54, before "a" (second occurrence) insert --indicating--.
Column 19, line 2, before "following" insert --the--.

Signed and Sealed this

Fifteenth Day of May, 2001

Attest:

NICHOLAS P. GODICI

Attesting Officer     Acting Director of the United States Patent and Trademark Office